United States Patent [19]
Miller

[11] 3,958,112
[45] May 18, 1976

[54] CURRENT MODE BINARY/BCD ARITHMETIC ARRAY

[75] Inventor: Homer W. Miller, Peoria, Ariz.

[73] Assignee: Honeywell Information Systems, Inc., Phoenix, Ariz.

[22] Filed: May 9, 1975

[21] Appl. No.: 576,075

[52] U.S. Cl.............................. 235/174; 235/175
[51] Int. Cl.² ......................................... G06F 7/50
[58] Field of Search............................ 235/174, 175

[56] References Cited
UNITED STATES PATENTS

| | | | |
|---|---|---|---|
| 3,265,876 | 9/1966 | Lethin................................ | 235/173 |
| 3,596,074 | 7/1971 | Mitrofanoff........................ | 235/174 |
| 3,711,693 | 1/1973 | Dahl................................... | 235/174 |
| 3,752,394 | 9/1973 | Igel.................................... | 235/174 |

OTHER PUBLICATIONS

Bodner and Leininger "Eight-bit Arithmetic & Logic Unit" IBM Tech. Disclosure Bulletin, Vol. 13, No. 8 Jan. 1975, pp. 2402–2406.

*Primary Examiner*—David H. Malzahn
*Attorney, Agent, or Firm*—David A. Frank

[57] ABSTRACT

An arithmetic logic array employing soft-saturating current mode logic gates operates on pure binary data or binary coded decimal data. Two 4-bit data inputs are received along with a 5-bit Op code, a carry input, and decimal arithmetic operation signals. In response to a decimal add (DA) one data input is increased by a count of six, and in response to either a BCD add or a BCD subtract (DA + DS) the output is decreased by a count of six if no carry output is generated.

5 Claims, 19 Drawing Figures

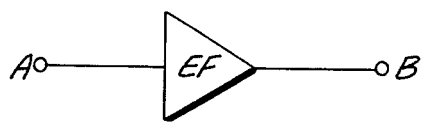
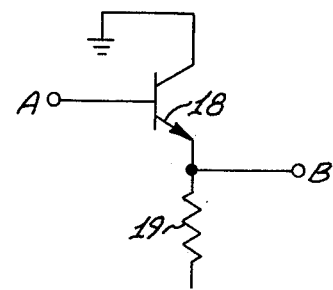
Fig. 3a　　　　　Fig. 3b
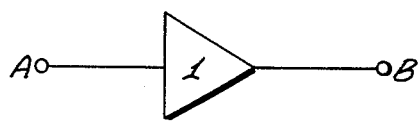
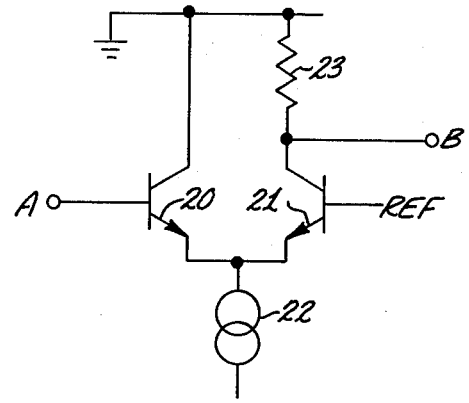
Fig. 4a　　　　　Fig. 4b
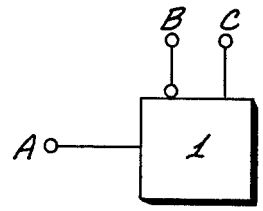
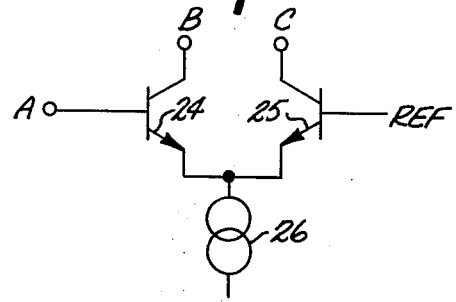
Fig. 5a　　　　　Fig. 5b
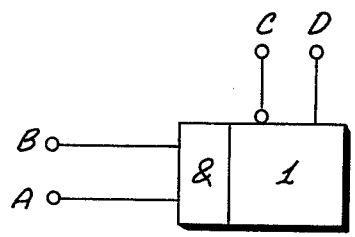
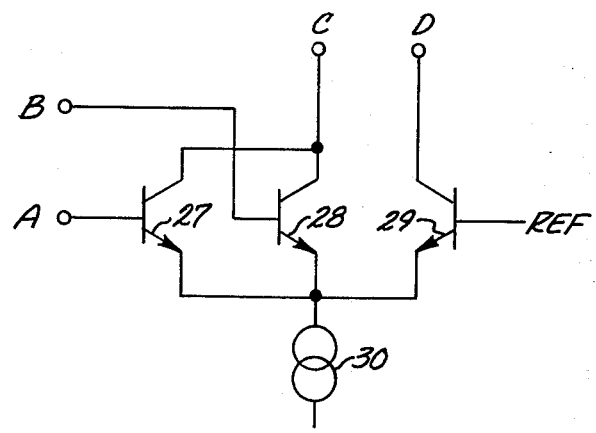
Fig. 6a　　　　　Fig. 6b

CURRENT MODE BINARY/BCD ARITHMETIC ARRAY

CROSS-REFERENCE TO RELATED APPLICATIONS

Honeywell Information System Inc.,
Ser. No. 562,316, now U.S. Pat. No. 3,925,651; 3925,651;
Filed Mar. 26, 1975;
"CURRENT MODE ARITHMETIC LOGIC ARRAY",
Inventor: Homer W. Miller.
Honeywell Information System Inc.,
Ser. No. 562,327, now U.S. Pat. No. 3,925,652;
Filed Mar. 26, 1975
"CURRENT MODE CARRY LOOK-AHEAD ARRAY",
Inventor: Homer W. Miller.

FIELD OF THE INVENTION

This invention relates generally to electronic logic circuitry, and more particularly to arithmetic logic circuitry for binary and binary coded decimal, hereinafter BCD, data and employing current mode logic.

BACKGROUND OF THE INVENTION

Advancements in the technology of digital computation are coming at the systems level via programming techniques and at the hardware level through improved circuit technology including processing and packaging as well as logic circuit design.

The logic employed in digital circuits may be either voltage mode or current mode. Heretofore, voltage mode logic (e.g. diode-transistor logic and transistor-transistor logic), wherein the voltage level of the signal imports the content, has been predominant. However, with increases in computer speed now being limited to a large extent by circuit operation time, the inherent delay attendant with transistor saturation in voltage mode logic presents a limiting parameter.

Current mode logic, wherein logic is transmitted through currents, overcomes some of the limitations of voltage mode logic. For example, fewer circuit elements and less supply power is required than for voltage logic. An importantly, "soft-saturating" gates may be employed which permit increased circuit speed.

Disclosed in my copending application Ser. No. 562,316 is a current mode arithmetic logic array which operates on pure binary data. The array employs interconnected soft-saturating current mode logic series gates including a lower level gate and an upper level gate with the output voltage range of the array limited to approximately one-half volt. The array has a number of modes of operation, and to expedite operation on large numbers the array may be used in combination with the carry look-ahead current mode logic array disclosed in my copending application Ser. No. 562,327 filed Mar. 26, 1975.

One limitation of the arithmetic logic array in my copending application Ser. No. 562,316 filed Mar. 26, 1975 is the applicability of the array only with binary data; the array does not operate on decimal coded data. Logic arrays have been proposed heretofore which operate on both binary and binary coded decimal data, such as for example, U.S. Pat. No. 3,711,693, assigned to the present assignee, but this array does not employ current mode logic.

OBJECTS OF THE INVENTION

An object of the present invention is an improved arithmetic logic circuit for performing operations on binary and binary coded decimal data and employing current mode logic.

Another object of the invention is an arithmetic logic array for binary/BCD data which lends itself to large scale integration in semiconductor processing.

Yet another object of the invention is a binary/BCD arithmetic logic array which may be interconnected with other arrays to expeditiously process large binary/BCD numbers.

SUMMARY OF THE INVENTION

The binary/BCD arithmetic logic array in accordance with the present invention has a logic portion including a half-adder and other logic function capabilities for two data inputs, a carry look-ahead portion and a half-sum and carry portion. Means are provided for receiving two inputs, a mode control input, and a carry input. The output resultant of the logic function and a carry output are provided. Additionally, the arithmetic logic array may be interconnected with other similar arrays for operating on larger numbers, and propagate, generate, and the carry output are provided to expedite such operations.

To facilitate arithmetic operations on binary coded decimal data, another circuit portion is provided to add six to one data input to the array for binary coded decimal addition. The excess six is required to generate a carry when the sum reaches or exceeds ten, as opposed to the carry generate at level 16 for 4-bit binary data. Further, the operation output is processed by another portion which is responsive to a binary coded decimal addition or subtraction operation to subtract six from the output if the operation does not generate a carry.

Importantly, each portion of the arithmetic logic array comprises a soft-saturating current mode series gate as a basic circuit element. Several variations of the gate, depending on inputs and functions, are utilized in building subcircuit arrays which are combined to provide the larger arithmetic logic circuit array.

These and other objects and features of the invention will be more fully understood from the following detailed description and appended claims when taken with the drawings.

BRIEF DESCRIPTION OF THE DRAWINGS

FIGS. 3–10 are logic diagrams and equivalent electrical circuits of basic elements employed in the binary/BCD arithmetic logic array of the present invention;

DESCRIPTION OF A PREFERRED EMBODIMENT

Figure 1:
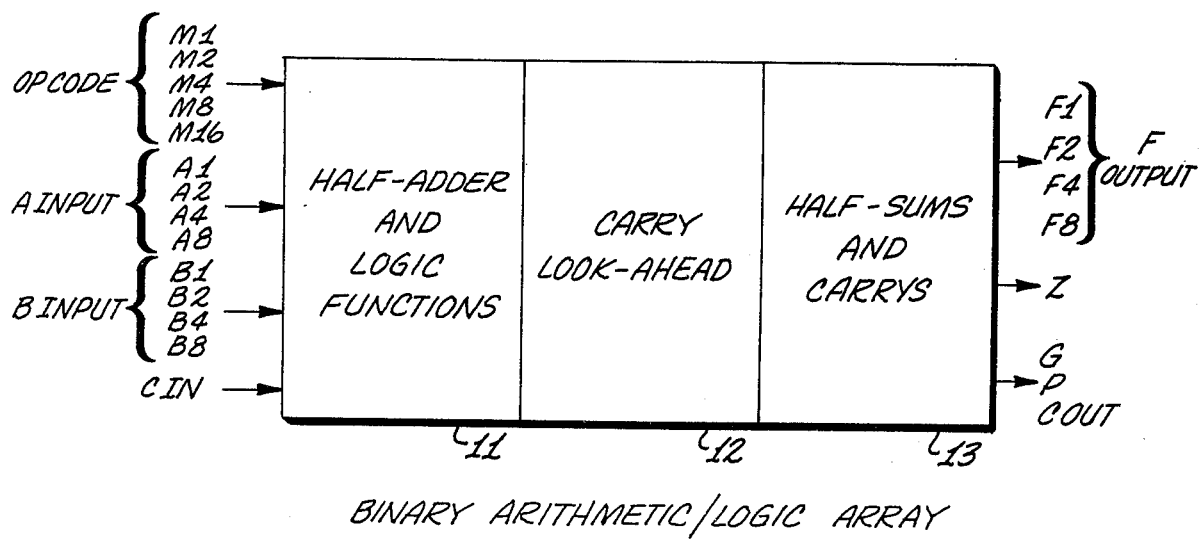
FIG. 1 is a functional diagram of the arithmetic logic array in accordance with my application Ser. No. 562,316.

FIG. 1 is a functional diagram of the arithmetic logic array disclosed in my copending application Ser. No. 562,316. Basically, the array 10 comprises three portions including a half-adder and a logic function portion 11, a carry and look-ahead portion 12, and a half-sum and carry portion 13.

Generally, portion 11 functions in response to a binary operation code M1–M16 to logically manipulate the corresponding binary bits of an A input (A1–A8) and a B input (B1–B8). Each of the circuit elements in portion 11 generates two output signals, a half-sum and a generate carry, which together with the carry input are provided to and utilized by the carry look-ahead portion 12 which generates carry signals for the binary levels 2, 4, 8, and 16. The carry signal for level 1 is the carry input, Cin.

The half sum and carry portion 13 utilizes the carry outputs and half sums generated by portions 12 and 11, respectively, along with an operation code input, and generates a binary output, F1–F8, in accordance with the arithmetic or logic function defined by the input operation code. Additionally, portion 13 provides a Z output which indicates that the F output (F1–F8) is zero. Further, portion 12 produces a generate (G), a propagate (P), and a carry out (Cout) which have utility when the array of FIG. 1 is used in combination with other arrays and particularly with the unique look-ahead carry function array which is disclosed in copending application Ser. No. 562,327. Use of the G and P outputs is unique to the operation of the look-ahead carry array and utilization thereof is described in detail in application Ser. No. 562,327. The carry out (Cout) signal is utilized when the array of FIG. 1 is employed with other arrays and may be used with the carry look-ahead array of application Ser. No. 562,327. In such an arrangement, the carry out signal provides the carry input to the succeeding arithmetic logic array.

A more detailed description of the array 10 of FIG. 1 may be found in copending application Ser. No. 562,316. As stated above, the array is limited to arithmetic and logical operations on pure binary data, and a primary objective of the present invention is to modify the array to accommodate arithmetic operations on binary coded decimal data.

Figure 2:
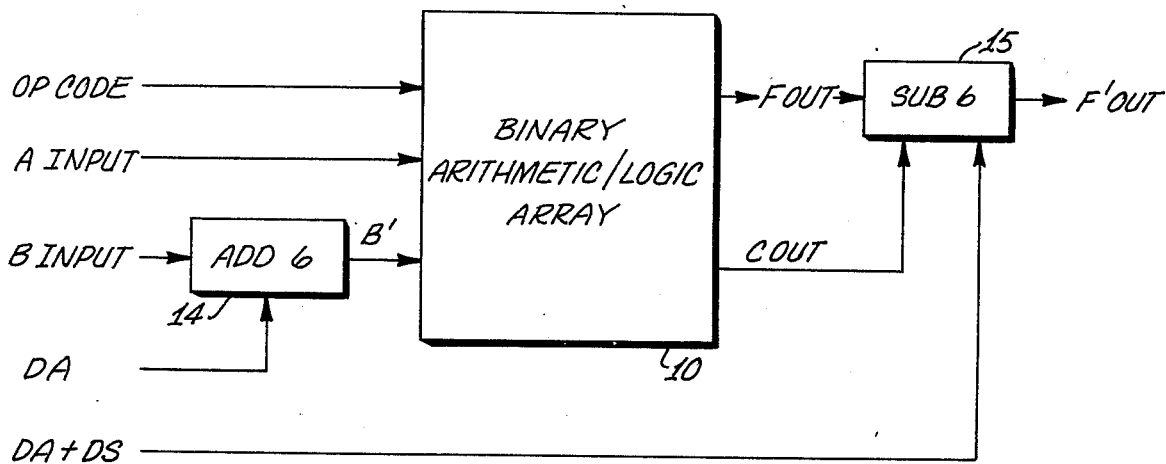
FIG. 2 is a functional diagram of the binary/BCD arithmetic logic array in accordance with the present invention.

Referring to FIG. 2, in accordance with the present invention the binary arithmetic/logic array 10 of FIG. 1 is modified by adding a circuit portion 14 which modifies the B operand input in response to a decimal add (DA) signal to add six to the B input for addition of the A input and the B input. Another circuit portion 15 is responsive to either a data add or a data subtract (DA+DS) signal to subtract six from the array output Fout, when an output carry (Cout) is not generated, and produces the true decimal output F′out. For pure binary data operations, portions 14 and 15 are inactive and do not modify the data provided thereto, and the binary arithmetic/logic array 10 functions as described in my copending application Ser. No. 562,316.

As stated above and as described in my copending application Ser. No. 562,316, the arithmetic logic array employs a soft-saturating current mode series gate including several basic circuit building blocks, the most elemental of which are illustrated in FIGS. 3–10. In these figures the logic diagram or symbol is illustrated along with a schematic of the equivalent electrical circuits. As will be described, the series gate includes a lower level gate and an upper level gate which in combination have an output voltage swing of only approximately 0.5 volt. This limited voltage swing reduces power requirements and reduces transition times.

FIG. 3a is the symbol for an emitter follower with an input A and an output B and which is typically employed in a circuit where the signal at A has a large fan-out or is applied as the input to a plurality of circuits. The equivalent electrical circuit is shown in FIG. 3b where the input A is applied to the base of transistor 18 and the output B is taken at the common terminal of resistor 19 and the emitter of transistor 18.

FIG. 4a is a buffer wherein input A is applied unchanged at the output B but which provides isolation between points A and B. In the electrical schematic of FIG. 4b input A is applied to the base of transistor 20 and the output B is taken at the collector of transistor 21. The emitters of transistors 20 and 21 are connected to current source 22, and the collector of transistor 20 is connected directly to ground and the collector of transistor 21 is connected through resistor 23 to ground. In operation and assuming a negative logic wherein 0 volt corresponds to a binary 0 and a −0.5 volt corresponds to a binary 1, a reference voltage of −0.26 volt is applied to the base of transistor 21. With NPN bipolar transistors as illustrated a binary 0 at input A causes conduction of transistor 20 and nonconduction of transistor 21 whereby the binary 0 is reflected as a 0 current at output B. Conversely, a binary 1 at input A renders transistor 20 nonconductive and transistor 21 is conductive thereby reflecting a binary 1 current at the output B.

FIG. 5a is a lower level gate buffer with an input A, a real output C and a complement output B. In the electrical schematic of FIG. 5b input A is applied to the base of transister 24, a reference voltage of approximately −1.06 volts is applied to the base of transistor 25, and the common emitters of transistors 24 and 25 are connected to current source 26. Output B is taken at the collector of transistor 24 and output C is taken at the collector of transistor 25.

FIG. 6a is another lower level gate with inputs A and B and a real (AND) output D and a complement (NAND) output C. In the electrical schematic of FIG. 6b the A and B inputs are applied to the bases of transistors 27 and 28, respectively, and a reference voltage of about −1.06 volts is applied to the base of transistor 29. The emitters of the transistors are connected in common to current source 30 and the D (A.B) output is taken at the collector of transistor 29 and the C ($\overline{A.B}$) output is taken at the common terminal of the collectors of transistors 27 and 28.

Figure 7A:
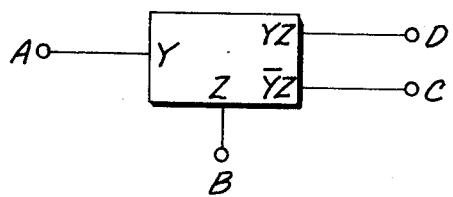
Figure 7B:
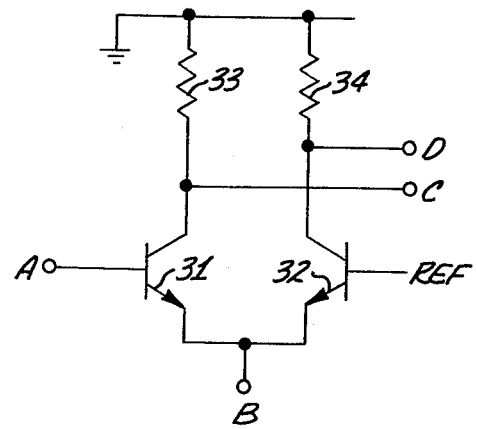

The upper level gate in FIG. 7 has inputs A and B applied to terminals Y and $\overline{Z}$, respectively, with the C and D outputs providing a $\overline{Y}.Z$ and a Y.Z output, respectively. In the equivalent electrical schematic of FIG. 7b input A is applied to the base of transistor 31 and input B is applied to the common terminal of the emitters of transistors 31 and 32. A reference voltage of −0.26 volt is applied to the base of transistor 37, and the collectors of transistors 31 and 32 are connected through resistors 33 and 34, respectively, to ground. The C output is taken at the collector of transistor 31 and the D output is taken at the collector of transistor 32.

Figure 8A:
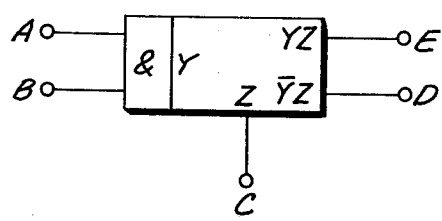
Figure 8B:
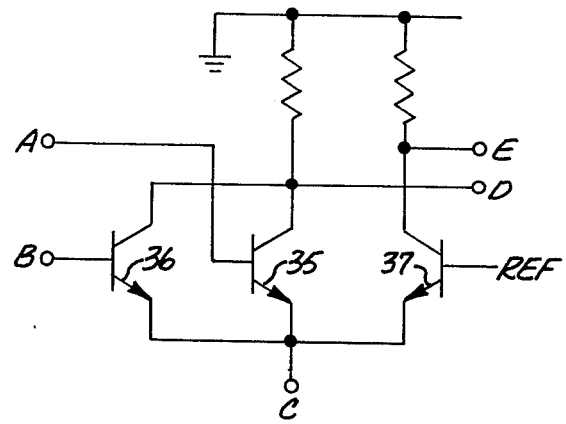

The upper level gate in FIG. 8a is similar in function to FIG. 7a but with the Y variable being the AND function of inputs A and B and the Z function being the input C. Thus, output E equals A.B.C. and output D equals $\overline{A}.\overline{B}.C$. In the electrical equivalent of FIG. 8b, the A and B inputs are applied to the bases of transistors 35 and 36, respectively, the C input is applied to the common terminal of the emitters of transistors 35, 36, and 37; the D output is taken at the common terminal of the collectors of transistors 35 and 36; and the E output is taken at the collector of transistor 37. For current to flow through the E output, inputs A and B must both be a 1 or −0.5 volt (thus rendering transistor 37 conductive) and input C must be present. Otherwise, if either the A or B inputs are a binary 0 (0 volt) and the Z input is present current will flow through output terminal D.

The upper level gates of FIGS. 7 and 8 are used in combination with the lower level gates of FIGS. 5 and 6. As described, the reference voltage for the upper level gates is −0.26 volt and the logic inputs being either 0 volt or −0.5 volt. The output voltage swings between 0 and −0.5 volt. Inputs to the lower level gates are derived from emitter followers, and the consequent voltage translation necessitates a reference voltage of −1.06 volts therefor.

Figure 9:
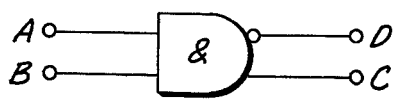
Figure 10A:
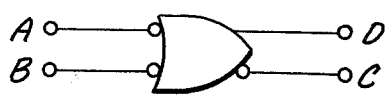

The logic diagrams of FIGS. 9 and 10 are equivalent wherein FIG. 9 performs an AND function on the inputs A and B with the real output provided at C and the complement or NAND output provided at D. The OR gate of FIG. 10 is equivalent in function wherein the A and B inputs are inverted prior to application to the OR gate with output D being real ($\overline{A} + \overline{B}$) and output C being inverted (A.B).

Figure 10B:
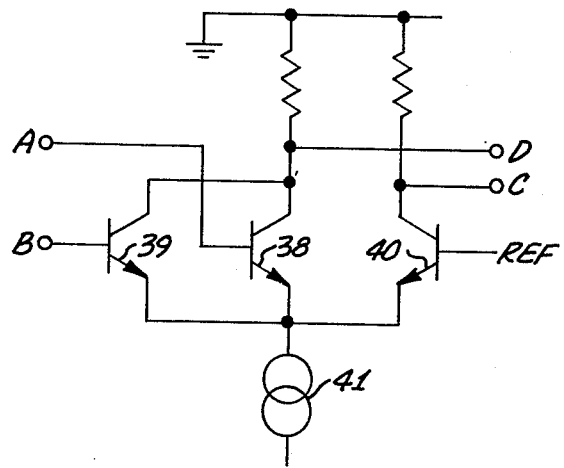

In the equivalent schematic circuit of FIG. 10b, the A and B inputs are applied to the bases of transistors 38 and 39, respectively, and a reference voltage is applied to the base of transistor 40. A current source 41 is connected to the common terminal of the emitters of transistors 38, 39, and 40; the C output is taken at the collector of transistor 40 and the D output is taken at the common terminal of the collectors of transistors 38 and 39. If the inputs A and B are both binary 1 then output C becomes a binary 1 due to current through transistor 40. If inputs A and B are not binary 1, then output D becomes a binary 1 due to current through either transistor 38 or 39.

With these basic functional elements defined by logic diagram and equivalent circuits, specific embodiments of the add six circuit portion 14 and the subtract six circuit portion 15 (with reference to FIG. 2) will be described with reference to FIGS. 11 and 12, respectively.

Figure 11:
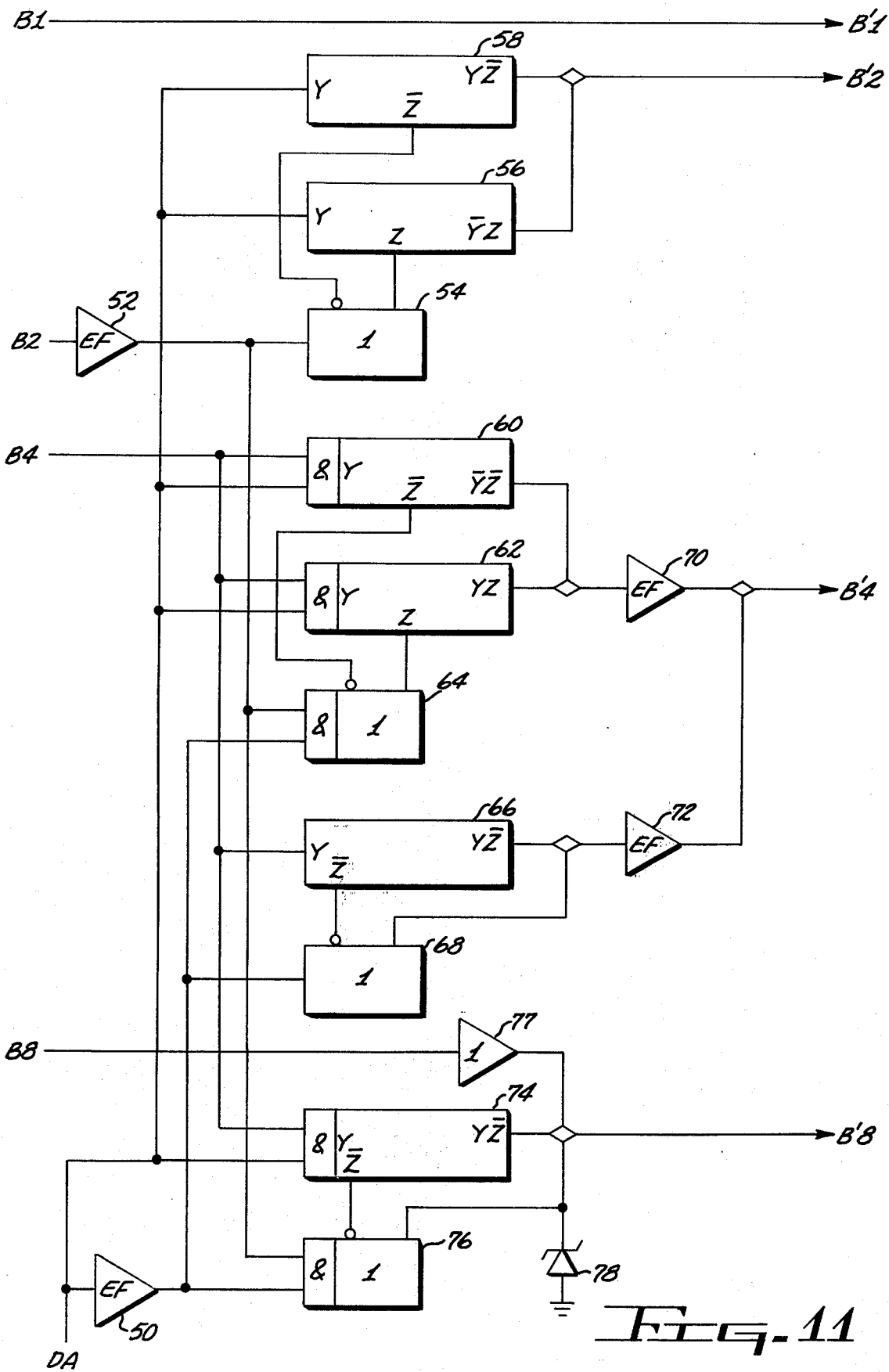
FIG. 11 is a schematic of the circuit portion in accordance with the invention which is employed to add six to one input in response to a decimal addition operation.

FIG. 11 is a schematic of the circuit portion 14 in accordance with the present invention which is employed to add six to the B input in response to a decimal addition (DA) signal as shown in FIG. 2.

Referring to FIG. 11 it is noted that the B1 input is not modified by a decimal addition operation. The B2, B4, and B8 inputs however are modified in response to the data addition (DA) signal which is applied to the several functional elements through emitter follower 50. As used herein and described in copending application Ser. No. 562,316, emitter followers in accordance with the basic elements shown in FIGS. 3–10 are utilized for two purposes: for performing an AND function and for voltage level shifting as required for upper and lower gates. The AND function is realized by connecting the outputs of a plurality of emitter followers, with the use of NPN transistors and with negative logic convention (a negative voltage level representing a binary 1). Upper level gates are responsive to voltage inputs or 0 to −0.5 volt while lower level gates are responsive to voltage inputs of −0.8 volt to −1.3 volt. An emitter follower provides this voltage translation.

The B2 input is applied through emitter follower 52 for voltage shifting to lower gate 54 which corresponds to the circuit in FIG. 5, and other lower level gates. The DA input is applied directly to the upper level gates. The real output of gate 54 is applied to the Z input of functional element 56 and the inverted output is applied to the $\overline{Z}$ input of functional element 58, elements 56 and 58 corresponding to the circuit in FIG. 7. The Y inputs to elements 56 and 58, and the $\overline{YZ}$ output of element 56 and the $Y\overline{Z}$ output of element 58 are connected together as a logical OR for the B'2 output.

The B4 signal is operated on by the combined upper level gates 60 and 62 which correspond to the circuit in FIG. 8, and the lower gate 64 which corresponds to the circuit in FIG. 6. The inputs to lower gate 64 and DA and B4 with the real output from lower gate 64 applied to the Z input of element 62 and the inverted output of lower gate 64 applied to the $\overline{Z}$ input of element 60. The $\overline{YZ}$ output of element 60 and the $YZ$ output of element 62 are ORed and applied through emitter follower 70. DA is applied as the input to lower gate 68 with the inverted output of 68 applied to the $\overline{Z}$ input of upper level gate 66. The real output from gate 68 is ORed with the $Y\overline{Z}$ output of gate 66, with B4 applied as the Y input to gate 66. The ORed outputs are then passed through emitter follower 72 which is connected to the output of emitter follower 70 to provide an AND function of the two outputs in deriving the B'4 signal.

B8 is operated on by the combined elements 74 and 76 which correspond respectively to the circuits in FIGS. 8 and 6. B4 and DA are applied as inputs to element 74, and DA and B2 are applied as inputs to element 76. The inverted output of element 76 is applied to the $\overline{Z}$ input of element 74 and the real output of lower gate 76 is ORed to the $Y\overline{Z}$ output of element 74 and B8 which is applied through buffer 77, corresponding to the circuit of FIG. 4. Schottky diode 78 is connected between the B'8 output and circuit ground to limit the negative voltage excursion at the outputs of elements 74 and 76.

The interconnected elements of FIG. 11 operate on the B inputs in accordance with the following equations and table:

Corrected B Operand Intermediate Signals (Ei)

$B'1 = B1$
$B'2 = \overline{DA}.(B2) + DA.(\overline{B2})$
$B'4 = \overline{DA}.(B4) + DA.(B4.B2 + \overline{B4}\,\overline{B2})$
$B'8 = \overline{DA}.(B8) + DA.(B8 + B4 + B2)$

| DA | B | B' | Notes |
|---|---|---|---|
| 0 | 00...15 | B | Logic, Binary Arithmetic, BCD Decimal Subtract Functions |
| 1 | 00...09 | B plus 6 | BCD Add Function |
| 1 | 10...15 | B minus 2 | Not Valid |

Figure 12:
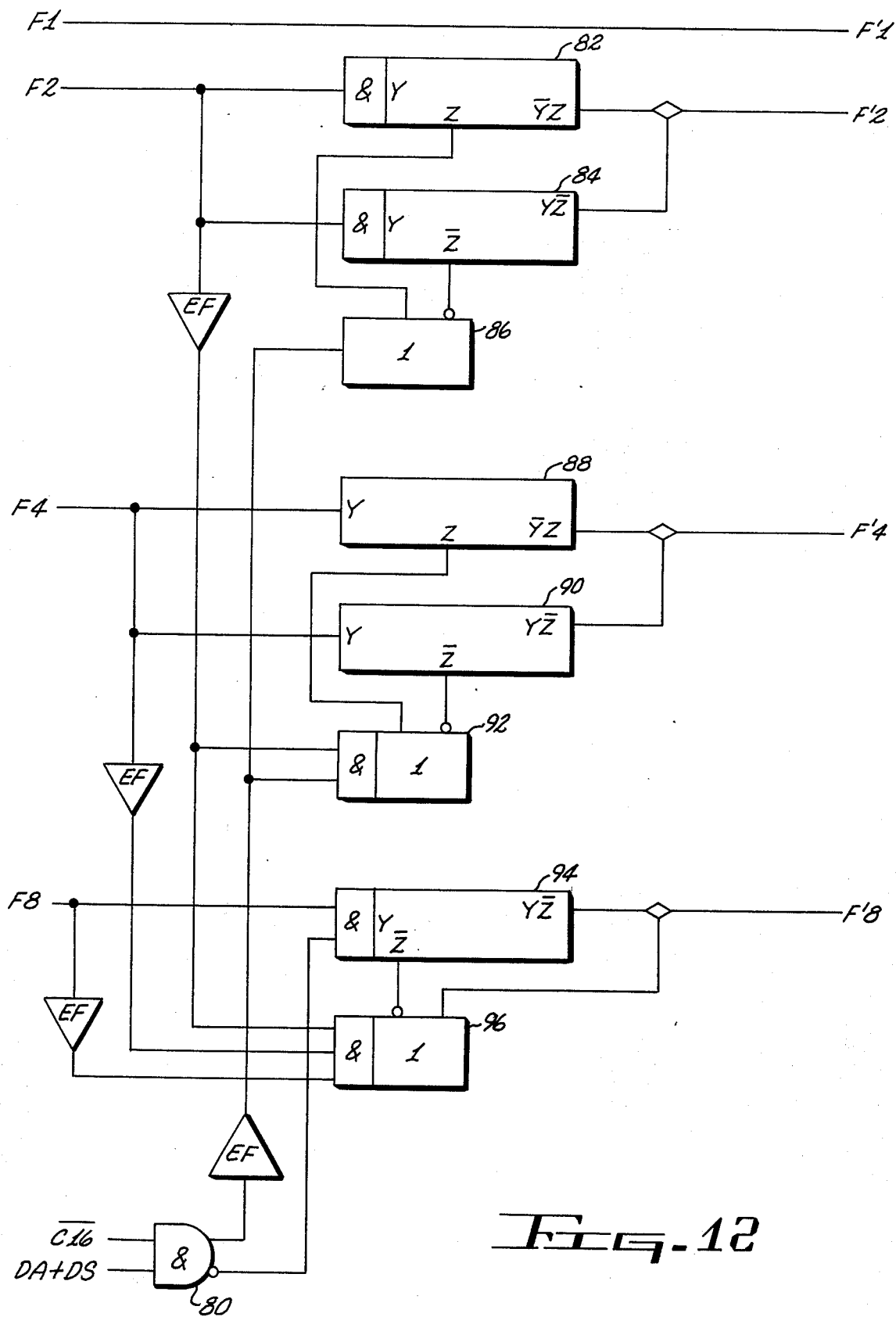
FIG. 12 is a schematic of the circuit portion in accordance with the invention which is responsive to a BCD addition or subtraction operation to subtract six from the operation output when a carry is not generated.

Referring to FIG. 12 a specific embodiment of the circuit portion 15 (with reference to FIG. 2) for modifying the array output in response to a decimal operation is shown. The F1 output is not modified while the F2, F4 and F8 outputs are modified by the interconnected functional elements in response to the presence of the DA + DS signal and the $\overline{C16}$ signal (no output carry) which are ANDed in gate 80.

F2 is operated on by upper gates 82 and 84 which correspond to circuits in FIG. 8 and lower level gate 86 which corresponds to the circuit in FIG. 5. The rear output of AND gate 80 is applied through an emitter follower as the input to gate 86 with the real output from gate 86 applied to the Z input of gate 82 and the inverted output of gate 86 applied to the $\overline{Z}$ input of element 84. The YZ output of gate 82 and the Y$\overline{Z}$ output of gate 84 are ORed to produce the F'2 output.

F4 is operated on by upper level gates 88 and 90 which correspond to the circuit in FIG. 7 and lower level gate 92 which corresponds to the circuit in FIG. 6. The real output of gate 80 and F2 are applied via emitter followers as the inputs to gate 92 with the real output of gate 92 applied as the Z input of gate 88 and the inverted output of gate 92 applied as the $\overline{Z}$ input of gate 90. The YZ output of gate 88 and the Y$\overline{Z}$ output of gate 90 are ORed to produce the F'4 output.

The F8 input is operated on by elements 94 and 96 which correspond to the circuits in FIG. 8 and FIG. 6, respectively. F2, F4, and F8 are connected as the inputs to lower level gate 96 with the inverted output of gate 96 connected to the $\overline{Z}$ input of upper level gate 94. F8 and the inverted output of gate 80 are applied as the Y inputs to upper level gate 94 with the YZ output of gate 94 and the real output of lower level gate 96 ORed to produce the F'8 output. The resultant operations on the F1–F8 outputs are given by the following equations and table:

F1 = F'1·
F2 = F'2 ⊕ [$\overline{C16}$. (DA + DS)]
F4 = F'4 ⊕ [F'2.$\overline{C16}$. (DA + DS)]
F8 = F'8 . [F'4.F'2 + C16 + ($\overline{DA + DS}$)]

| DA + DS | C16,F | F | Notes |
|---|---|---|---|
| 0 | 00...31 | F' | Logic or Binary Arithmetic Function |
| 1 | 16...25 | F' | BCD Add or Subtract Functions |
| 1 | 6...15 | F' minus 6 | |
| 1 | 0...5 | | Not Valid |
| 1 | 25...31 | | Not Valid |

The resultant logic equations and tables for the binary/BCD arithmetic logic array described above are given by the following equations and tables:

| M8 | M4 | M2 | M1 | M16 = 0 | M16 = 1 |
|---|---|---|---|---|---|
| 0 | 0 | 0 | 0 | F = A | F = A plus C1 |
| 0 | 0 | 0 | 1 | F = A + B | F = A + B plus C1 |
| 0 | 0 | 1 | 0 | F = A + $\overline{B}$ | F = A + $\overline{B}$ plus C1 |
| 0 | 0 | 1 | 1 | F = logical 1 | F = minus 1 plus C1 |
| 0 | 1 | 0 | 0 | F = A . B | F = A plus (A.$\overline{B}$) plus C1 |
| 0 | 1 | 0 | 1 | F = B | F = (A+B) plus (A.$\overline{B}$) plus C1 |
| 0 | 1 | 1 | 0 | F = A ⊕ B | F = A minus B minus 1 plus C1 (NOTE 1) |
| 0 | 1 | 1 | 1 | F = $\overline{A}$ + B | F = (A.$\overline{B}$.) minus 1 plus C1 |
| 1 | 0 | 0 | 0 | F = A . $\overline{B}$ | F = A plus (A.B) plus C1 |
| 1 | 0 | 0 | 1 | F = A ⊕ B | F = A plus B plus C1 (NOTE 2) |
| 1 | 0 | 1 | 0 | F = $\overline{B}$ | F = (A+$\overline{B}$) plus (A.B) plus C1 |
| 1 | 0 | 1 | 1 | F = $\overline{A}$ + $\overline{B}$ | F = (A.B) minus 1 plus C1 |
| 1 | 1 | 0 | 0 | F = logical 0 | F = A plus A plus C1 |
| 1 | 1 | 0 | 1 | F = $\overline{A}$ . B | F = (A+B) plus A plus C1 |
| 1 | 1 | 1 | 0 | F = $\overline{A}$ . $\overline{B}$ | F = (A+$\overline{B}$) plus A plus C1 |
| 1 | 1 | 1 | 1 | F = $\overline{A}$ | F = A minus 1 plus C1 |

NOTE 1: BCD subtract if A ≤ 9, B ≤ 9, DA + DS = 1
NOTE 2: BCD add if A ≤ 9, B ≤ 9, DA = 1, DA + DS = 1

The binary/BCD arithmetic logic array in accordance with the present invention, while similar to the array disclosed in my copending application Ser. No. 562,316, allows increased functionality in accommodating binary coded decimal addition and subtraction. The resulting array, using current mode logic series gates with limited output voltage swing, provides increased speed and circuit adaptability. While the invention has been described with reference to a specific embodiment, the description is illustrative and is not to be construed as limiting the scope of the invention. Various modifications and changes may occur to those skilled in the art without departing from the true spirit and scope of the invention as defined by the appended claims.

What I claim is:

1. A current mode arithmetic logic array for operating on pure binary and on binary coded decimal data comprising:

a first array portion for receiving a carry input, a binary operation code, and first and second binary signal inputs and producing half-sum of said inputs and carry generate output signals in response to said binary operation code, a second array portion receiving said carry input, said half-sums and said carry generate signals and producing carry signals for each binary level of said first and second signals other than the least significant binary level, a third array portion responsive to said half-sum signals from said first portion, said carry signals from said second portion, and said operation code and producing a binary output resultant of the operation defined by said operation code on said first and second binary signals, a fourth array portion responsive to a Decimal Add (DA) signal for adding a count of six to one of said inputs prior to reception thereof by said first array portion, and a fifth array portion responsive to either a Decimal Add or a Decimal Subtract (DA + DS) signal for subtracting a count of six from the output from said third array portion if a carry output (C16) from said third array is not present, all of said array portions comprising soft saturating current mode logic series gates including a lower level gate and an upper level gate having an output voltage range limited to approximately 0.5 volt.

2. A current mode arithmetic logic array as defined by claim 1 wherein said soft saturating current mode logic gates include an upper level gate comprising a first NPN bipolar transistor and at least a second NPN bipolar transistor, means interconnecting the emitters of said first and second transistors to a common terminal, means interconnecting a current source to said common terminal, resistive means connecting the collector of said first transistor to a circuit ground potential, means connecting the collector of said second transistor to circuit ground potential, means applying a reference voltage of approximately −0.26 volt to the base of said first transistor, whereby binary input signals of 0 volt and −0.5 volt applied to the base of said second transistor are translated to output terminals at the collectors of said first and second transistors as real and complement outputs, respectively, of either 0 volt or −0.5 volt.

3. A current mode arithmetic logic array as defined by claim 1 wherein said binary/BCD opertion code is defined by the following table:

| M8 | M4 | M2 | M1 | M16=0 | M16=1 |
|---|---|---|---|---|---|
| 0 | 0 | 0 | 0 | F=A | F=A plus C1 |
| 0 | 0 | 0 | 1 | F=A + B | F=A + B plus C1 |
| 0 | 0 | 1 | 0 | F=A + $\overline{B}$ | F=A + $\overline{B}$ plus C1 |
| 0 | 0 | 1 | 1 | F=logical 1 | F=minus 1 plus C1 |
| 0 | 1 | 0 | 0 | F=A . B | F=A plus (A.$\overline{B}$) plus C1 |
| 0 | 1 | 0 | 1 | F=B | F=(A+B) plus (A.$\overline{B}$) |
| 0 | 1 | 1 | 0 | F=$\overline{A \oplus B}$ | F=A minus B minus 1 plus C1 (NOTE 1) |
| 0 | 1 | 1 | 1 | F=$\overline{A}$+B | F=(A.$\overline{B}$) minus 1 plus C1 |
| 1 | 0 | 0 | 0 | F=A . $\overline{B}$ | F=A plus (A.B) plus C1 |
| 1 | 0 | 0 | 1 | F=A $\oplus$ B | F=A plus B plus C1 (NOTE 2) |
| 1 | 0 | 1 | 0 | F=$\overline{B}$ | F=(A+$\overline{B}$) plus (A.B) plus C1 |
| 1 | 0 | 1 | 1 | F=$\overline{A}$ + B | F=(A.B) minus 1 plus C1 |
| 1 | 1 | 0 | 0 | F=logical 0 | F=A plus A plus C1 |
| 1 | 1 | 0 | 1 | F=$\overline{A}$ . B | F=(A+$\underline{B}$) plus A plus C1 |
| 1 | 1 | 1 | 0 | F=$\overline{A}$ . $\overline{B}$ | F=(A+$\overline{B}$) plus A plus C1 |
| 1 | 1 | 1 | 1 | F=$\overline{A}$ | F=A minus 1 plus C1 |

NOTE 1
BCD subtract if A $\leq$ 9, B $\leq$ 9, DA + DS = 1
NOTE 2
BCD add if A $\leq$ 9, B $\leq$ 9, DA = 1, DA + DS = 1

4. A current mode arithmetic logic array as defined by claim 1 wherein said fourth portion operates on a B operand input (B1, B2, B4, B8) to produce a B' operand input (B'1, B'2, B'4, B'8) in accordance with the following equations:

B'1 = $\underline{B1}$
B'2 = $\overline{DA}$ . (B2) + DA . ($\overline{B2}$)
B'4 = $\overline{DA}$ . (B4) + DA . (B4.B2 + $\overline{B4}$ $\overline{B2}$)
B'8 = $\overline{DA}$ . (B8) + DA . (B8 + B4 + B2)

5. A current mode arithmetic logic array as defined by claim 1 wherein said fifth array portion operates on the F output (F1, F2, F4, F8) to produce an F' output (F'1, F'2, F'4, F'8) in accordance with the following equations:

F1 = F'1
F2 = F'2 $\oplus$ [$\overline{C16}$ . (DA + DS)]
F4 = F'4 $\oplus$ [F'2.$\overline{C16}$ . (DA + DS)]
F8 = F'8 . [F'4.F'2 + C16 + ($\overline{DA + DS}$)].

* * * * *